United States Patent
Van Stam

(10) Patent No.: US 8,132,219 B2
(45) Date of Patent: Mar. 6, 2012

(54) INTELLIGENT PEER-TO-PEER SYSTEM AND METHOD FOR COLLABORATIVE SUGGESTIONS AND PROPAGATION OF MEDIA

(75) Inventor: Wijnand Van Stam, Sunnyvale, CA (US)

(73) Assignee: TiVo Inc., Alviso, CA (US)

( * ) Notice: Subject to any disclaimer, the term of this patent is extended or adjusted under 35 U.S.C. 154(b) by 1594 days.

(21) Appl. No.: 10/168,782

(22) PCT Filed: Dec. 21, 2000

(86) PCT No.: PCT/US00/35035
§ 371 (c)(1), (2), (4) Date: Jun. 21, 2002

(87) PCT Pub. No.: WO01/46843
PCT Pub. Date: Jun. 28, 2001

(65) Prior Publication Data
US 2003/0014759 A1  Jan. 16, 2003

Related U.S. Application Data

(60) Provisional application No. 60/171,829, filed on Dec. 21, 1999, provisional application No. 60/226,856, filed on Aug. 22, 2000.

(51) Int. Cl.
*H04N 7/173* (2006.01)
*H04N 7/10* (2006.01)
*H04N 7/16* (2006.01)

(52) U.S. Cl. .............. 725/105; 725/46; 725/32; 725/34; 725/35

(58) Field of Classification Search .................. 725/105, 725/46, 32, 34, 35
See application file for complete search history.

(56) References Cited

U.S. PATENT DOCUMENTS
5,410,344 A   4/1995   Graves et al.
5,583,763 A * 12/1996   Atcheson et al. ............. 707/750
(Continued)

FOREIGN PATENT DOCUMENTS
EP   0 854 645 A2   7/1998
(Continued)

OTHER PUBLICATIONS
XP-002154116, Metabyte Announces Personalized TV Software, www.mbtv.com.
(Continued)

*Primary Examiner* — Pankaj Kumar
*Assistant Examiner* — Franklin Andramuno
(74) *Attorney, Agent, or Firm* — Hickman Palermo Truong & Becker LLP

(57) ABSTRACT

In a network-based system for recommending media content items based on user preferences, clients contact a server on a periodic basis, independent of the user. In addition to client-server interaction, clients also interact with one another in peer-to-peer fashion. Peers query one another and evaluate their similarity to each other in an interactive comparison of user preferences. When two clients are sufficiently similar, the interaction culminates in the originating client downloading content listings from the targeted peer to generate suggestions for their user. If the two clients are dissimilar, the query may be terminated, or the targeted peer may route the query to a second targeted peer. In addition to the lists of preferences, the originating client may download actual content items from the targeted peers.

45 Claims, 2 Drawing Sheets

U.S. PATENT DOCUMENTS

| | | | |
|---|---|---|---|
| 5,758,257 | A | 5/1998 | Herz et al. |
| 5,758,259 | A | 5/1998 | Lawler |
| 5,790,935 | A | 8/1998 | Payton |
| 5,828,843 | A * | 10/1998 | Grimm et al. ................. 709/228 |
| 5,835,087 | A * | 11/1998 | Herz et al. ..................... 715/810 |
| 5,867,799 | A | 2/1999 | Lang et al. |
| 5,973,683 | A | 10/1999 | Cragun et al. |
| 5,983,214 | A * | 11/1999 | Lang et al. ........................ 707/1 |
| 6,005,597 | A | 12/1999 | Barrett et al. |
| 6,029,195 | A | 2/2000 | Herz |
| 6,061,650 | A * | 5/2000 | Malkin et al. ................. 704/228 |
| 6,088,722 | A | 7/2000 | Herz et al. |
| 6,092,049 | A * | 7/2000 | Chislenko et al. .............. 705/10 |
| 6,177,931 | B1 | 1/2001 | Alexander et al. |
| 6,249,785 | B1 | 6/2001 | Paepke |
| 6,266,649 | B1 | 7/2001 | Linden et al. |
| 6,317,881 | B1 | 11/2001 | Shah-Nazaroff et al. |
| 6,438,579 | B1 | 8/2002 | Hosken |
| 6,457,010 | B1 | 9/2002 | Eldering et al. |
| 6,460,036 | B1 | 10/2002 | Herz |
| 6,526,577 | B1 * | 2/2003 | Knudson et al. ................ 725/40 |
| 6,532,241 | B1 | 3/2003 | Ferguson et al. |
| 6,606,624 | B1 * | 8/2003 | Goldberg ........................ 707/6 |
| 6,642,939 | B1 | 11/2003 | Vallone et al. |
| 6,675,205 | B2 * | 1/2004 | Meadway et al. ............. 709/219 |
| 7,065,709 | B2 | 6/2006 | Ellis et al. |
| 7,146,627 | B1 | 12/2006 | Ismail et al. |
| 2003/0110503 | A1 * | 6/2003 | Perkes ............................ 725/86 |
| 2004/0117831 | A1 * | 6/2004 | Ellis et al. ........................ 725/53 |
| 2005/0027810 | A1 * | 2/2005 | Donovan ....................... 709/206 |
| 2005/0262542 | A1 * | 11/2005 | DeWeese et al. .............. 725/106 |
| 2006/0150216 | A1 | 7/2006 | Herz et al. |
| 2006/0190966 | A1 * | 8/2006 | McKissick et al. .............. 725/61 |
| 2006/0195362 | A1 | 8/2006 | Jacobi et al. |
| 2011/0061076 | A1 | 3/2011 | Ali et al. |

FOREIGN PATENT DOCUMENTS

WO    WO 99/35830 A1    7/1999

OTHER PUBLICATIONS

XP-000601284, GroupLens: An Open Architecture for Collaborative Filtering of Netnews, 1994.

Metabyte, "Metabyte Announces Personalized TV Software", Metabyte Networks, Inc., Press Release, XP-002154116, written Jan. 21, 1999, 1 page.

TIVO, "TIVO Brings Home HBO Through Agreement Benefitting Personal Television Service Users", press release, XP-002154115, written Jan. 28, 1999, 2 pages.

Caro, Mark, "Gene Siskel: A Man of Influence," The UK Critic, Feb. 22, 1999, located on the internet at http://www.ukcritic.com, retrieved on Jan. 19, 2007, 5 pages.

Sheth, Beerud Dilipm, "A Learning Approach to Personalized Information Filtering," Submitted to the Department of Electrical Engineering and Computer Science on Jan. 14, 1994, 72 pages.

* cited by examiner

INTELLIGENT PEER-TO-PEER SYSTEM AND METHOD FOR COLLABORATIVE SUGGESTIONS AND PROPAGATION OF MEDIA

PRIORITY CLAIM

This application claims benefit under 35 U.S.C. § 371 as a National Stage Entry of International Application PCT/US00/35035, filed Dec. 21, 2000, which claims priority to provisional application No. 60/171,829 filed Dec. 21, 1999 and provisional application No. 60/226,856 filed Aug. 22, 2000, to which provisional applications this application further claims benefit under 35 U.S.C. § 119(e). The applicant(s) hereby rescind any disclaimer of claim scope in the parent application(s) or the prosecution history thereof and advise the USPTO that the claims in this application may be broader than any claim in the parent application(s).

BACKGROUND OF THE INVENTION

1. Field of the Invention

The present invention relates to automated systems and methods for recommending items to users. More particularly, the invention relates to an automated peer-to-peer system and method for collaborative suggestions and propagation of media.

2. Description of Related Art

The prior art provides various systems for filtering, suggesting and rating of media content items. Common methods of suggesting and rating items occasionally employ collaborative filtering techniques, in which a user's preference profile is compared with profiles of similar users or groups of users. The co-pending application, K. Ali, W. Van Stam, "Intelligent system and methods of recommending media content items based on user preferences," U.S. patent application Ser. No. 10/168,808 (Jun. 21, 2002) discusses several of these collaborative filtering implementations. In addition, J. Atcheson, J. Miller, "Method and apparatus for recommending selections based on preferences in a multi-user system," U.S. Pat. No. 5,583,763 (Dec. 10, 1996) describe a system for determining selections that a user is likely to be interested in. A determination is made, based on a user's prior indicated preferences, designated in a preferences list. The list is compared with other users' lists. When a large number of matches is found between two lists, the unmatched entries of the other user's list are extracted. Typically, these implementations require a client-server network environment and a stateful connection between the client and the server. Correlations are calculated on the server, based on data periodically supplied by the client, necessitating monitoring of the client state, thereby raising confidentiality concerns. It would be desirable to provide a collaborative suggestion system in which a stateful connection between client and server is unnecessary, thus reducing concerns about user privacy. The above-identified co-pending application, K. Ali, et al, supra, describes a distributed collaborative filtering engine that guarantees user privacy by eliminating the necessity of correlating the user to other user's or groups of users. Similarity is calculated on the client side, eliminating the necessity of a stateful connection between the server and the client. The described system, however, employs. a client-server architecture in which information is exchanged only between client and server. It would be an advantage to provide a system for collaborative suggestion in a peer-to-peer environment, which makes opportunistic use of an existing network connection, wherein peers evaluate their similarity to one another.

Peer-to-peer file sharing systems are becoming increasingly common. For example, the "Gnutella Support Pages," http://1 gnutella.wego.com (no date) describe a peer-to-peer network composed of a multiplicity of Gnutella clients, in which the client software includes an integrated search engine and file server. The Gnutella network changes constantly, according to the number of Gnutella clients that are on the network at any given time. No server exists, and the network infrastructure is provided by a publicly accessible network, such as the Internet. In order to access the Gnutella network, a user must have the network address of at least one other Gnutella client that is currently connected. A user in search of a particular information object, a digital music file, or a recipe, for example, may send a query over the network. The query is passed from client to client until the object is located or the query is terminated. While the Gnutella client allows the creation of a dynamic peer-to-peer network, and sharing of files between clients, the query process is user-initiated: queries are formulated and launched by the user with no automation of the query process. Additionally, the Gnutella network is primarily directed to file sharing, in which media content items are shared or propagated between users. There is no capability of comparing user profiles between clients in order to generate collaborative suggestions. Furthermore, the Gnutella network is concerned exclusively with the peer-to-peer network paradigm.

It would be a technological advance to provide a system for collaborative suggestions and media propagation that did not require a stateful connection between a client and server, thus safeguarding privacy of individual users. It would be a great advantage to implement such a system as a peer-to-peer based system that was capable of operating in parallel with client-server based suggestion systems, opportunistically employing the same network connection, wherein suggestions generated by both systems are presented in the same software interface. Furthermore, it would be desirable to automate the peer-to-peer system, so that clients could initiate and carry out interactions with each other without direction or intervention by a user.

SUMMARY OF THE INVENTION

A network-based intelligent system for predicting ratings for items of media content according to how likely they are to appeal to a user provides a parallel, peer-to-peer system and method for collaborative suggestions and propagation of media. Using a typical client-server architecture, clients contact a server on a periodic basis, independent of the user. In addition to client-server interaction, clients also make opportunistic use of the network connection to interact with one another in peer-to-peer fashion. The server organizes clients into groups and provides each client within a group with the network address of all other clients in the group. An originating client queries a targeted peer by transmitting a list indicative of its user's preferences. The targeted peer evaluates the similarity of the transmitted list with a list of its own. If the two clients are sufficiently similar, the comparison continues in an interactive fashion. After the initial determination by the targeted peer, the exchange of information proceeds in a stepwise manner, with the originating client evaluating similarity at each stage. If the two clients are dissimilar, either the originating client or the targeted peer may terminate the query, depending on the stage of the interaction; or the targeted peer may route the query to a second targeted peer. The interaction culminates in the originating client downloading content listings from the targeted peer to generate suggestions for their user. In addition to the lists of preferences, the originating client may download actual content items from the targeted peers.

DETAILED DESCRIPTION

Figure 1:
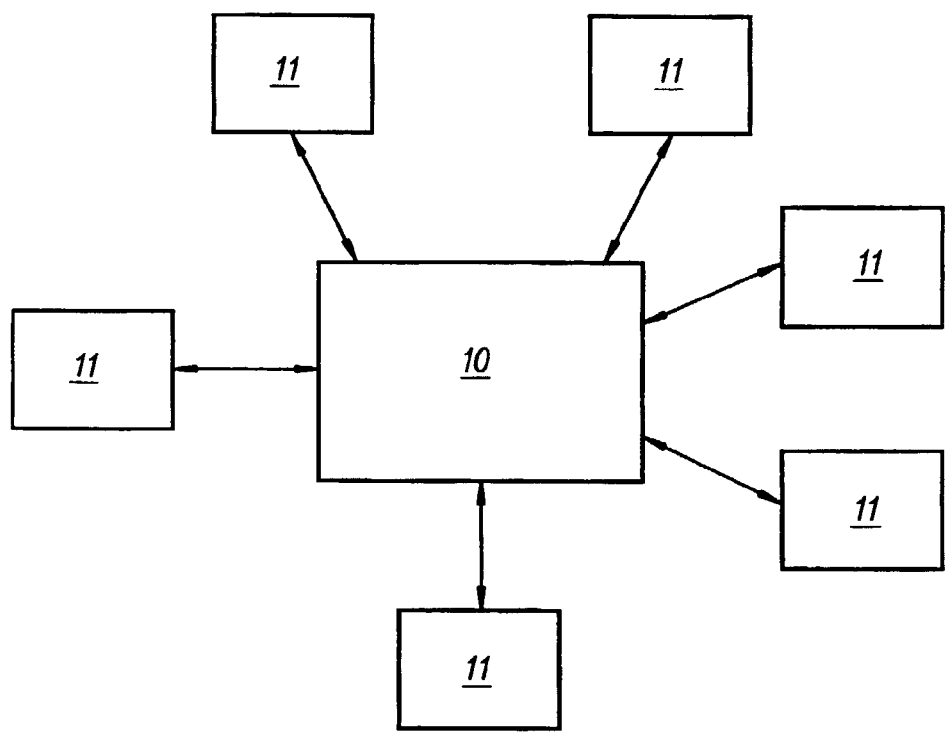
FIG. 1 provides a block diagram of a network-based video recording system, according to the invention.
Figure 2:
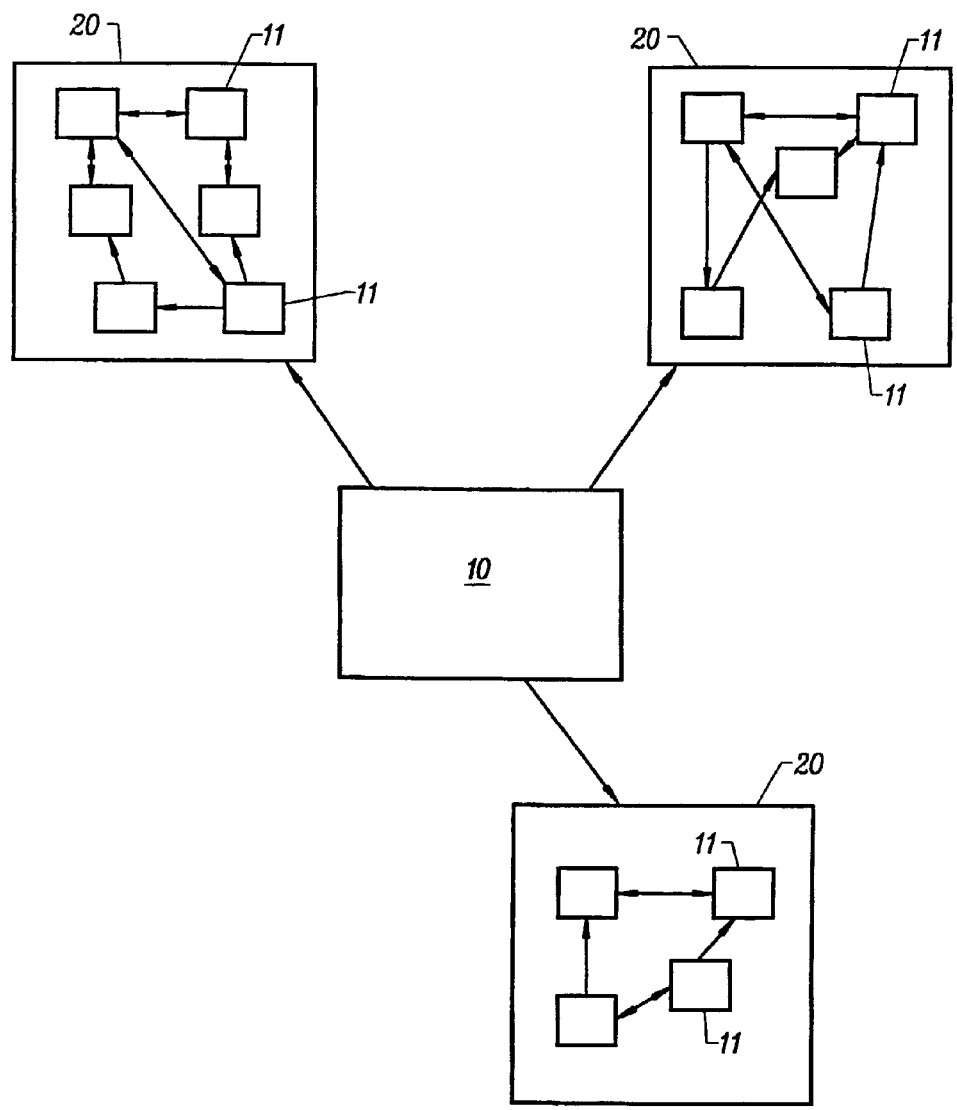
FIG. 2 provides a block diagram illustrating peer-to-peer interaction among the clients of the system of FIG. 1, according to the invention.

The co-pending application, K. Ali, et al., supra, provides an intelligent, distributed system for recommending items of content to a user, based on the user's expressed preferences. The described system, shown here in FIG. 1, employs a client-server network architecture in which each of a plurality of clients is periodically in contact with the server. In the described system, all interaction occurs between the client 11 and the server 10, as FIG. 1 shows. However, the current invention extends the suggestion generating capability of the previous system by making opportunistic use of the network connection to provide peer-to-peer interaction among the clients, so that the knowledge embodied on each of the clients is further leveraged by exchanging suggestions and content directly between clients, in peer-to-peer fashion. In the parallel peer-to-peer system, shown in FIG. 2, the server 10 is operative to organize simultaneously connected clients 11 into one or more groups 20, whereupon the server provides each client within a group 20 the network address of all other clients in the same group. Beyond this initial function, all interaction occurs among the clients, independently of the server, in parallel with the client-server interaction. In the system of the parent application, the client is in contact with the server for a short period of time to download current program guide data and to exchange data with the server for the purpose of generating collaborative suggestions. Since the time of connection varies from day-to-day, in a large community of users, the selection of clients connected to the network at any given time is apt to be fairly random, so that, over time, each client is randomly exposed to a large population of other clients, thereby enabling a rich exchange of information.

While the preferred embodiment of the invention employs the Internet as its network infrastructure, other publicly accessible telecommunications networks would also be suitable: for example, a cable television network. The presently preferred embodiment of the invention employs a dial up network connection. However, hardwired connections, for example, coaxial or fiber optic cable would also be suitable, particularly in the case of broadband implementations of the invention. Furthermore, wireless connections would also be consistent with the spirit and scope of the invention. The type of media involved is highly variable. While the present embodiment of the invention is concerned primarily with various types of television programming, the invention also finds application with text files, web sites, books, digital music; in short, almost any type of digital media.

Communication occurs directly between the clients, in a manner that is difficult to trace or monitor. Furthermore, network addresses are dynamically assigned, and are valid only for the duration of the connection. Thus, the temporary and anonymous nature of the peer-to-peer interaction provides an important safeguard to user privacy. During their interaction, two clients go through an interactive comparison procedure, in which they compare information that is highly indicative of their respective user's interests. At each step of the procedure, correlation, or similarity is calculated. If the correlations converge, the originating client may request user preference lists from the target peer. If such a convergence isn't reached or the correlation is deemed too low, then the query can be terminated or relayed to a second targeted peer. Various embodiments of the method of interaction between peers are described below.

Peer-To-Peer Suggestion System

In the invented system, a pool of client devices is simultaneously connected to a network. The presently preferred embodiment of the invention incorporates clients of a distributed personal video recording system, in which every client is a dedicated video recording unit. Resident on every client are several lists that are highly indicative of a user's preferences. Minimally, the lists include:

Lists of recorded items that are currently available for
      viewing;
   Lists of various types of items to record (single programs,
      series, programs of a particular subject or type, programs having a particular actor, and so on); and
   Lists of rated items.

I. Peer-To-Peer Interconnection

As previously indicated, clients connect to a central server periodically. In a larger community of users, there is a constant group of clients connected to the server, dynamic in nature, in which clients constantly come and go.

The server organizes clients by connection time, so that clients that have connected recently are all placed in the same group; additionally, the server controls group size. A larger group size is preferable in order to maximize the opportunity for interaction among clients. The server provides each client in the group network with network addresses to all other clients in the group. Following group formation, each client is free to contact any other client in the group directly.

II. Peer-To-Peer Interaction

The lists mentioned above may be hundreds or even thousands of items in length. Thus, exchanging an entire list or set of lists between clients may be impractical, particularly in the case of a narrowband dial up network connection. Therefore, a variety of methods have been provided to facilitate peer-to-peer interaction in a manner that economizes on time and network resources.

Method 1: Small Lists Having Dense Meaning. Each client has one or more compact lists of items that are highly representative of the user's preferences. These may be the list of series to record, or the list of items currently available. Each of them armed with such a list, an originating client (A) and targeted client (B) interact as follows:

Client A sends a query to B, consisting of the list, and the
      size of the other lists it has to exchange.
   Client B receives the query and compares A's list with its
      own corresponding list to determine the number of elements it shares in the list with client A. It now computes
      the similarity between A and B, according to an algorithm, resident on both A and B, in which:
      Similarity=Number of elements in common between A
         and B/number of elements reported by A. Similarity is
         expressed as a value in a range of approximately 0 to
         1. Client B may respond in one of several ways:
   If the similarity value is less than a first predetermined threshold, it can respond to A that B has nothing that A might be interested in.

If the similarity value exceeds the predetermined threshold, B can respond that A should be interested in B. In addition, B sends more information with the response that indicates relative sizes of B's lists, compared to A's. For example, B might say "Yes, you are 80% interested in me, and I have twice the number of ratings data that you have, and a third your size of recording history". Client A's response is described further below.

If the similarity value is less than the predetermined threshold, B may pass the query from A to a second targeted peer. Upon redirecting, a reference to B is appended to the query so that successive peers know not to pass the query to B. It also allows A to know which clients have evaluated its query when it receives a response. In any further queries originated by A, it will then skip over those that have already been queried.

If Client A receives a positive response from a targeted peer, comprising similarity values, relative list sizes and a listing of peers that have evaluated the query, further interaction is determined by A. If A determines that the similarity value is less than a second predetermined threshold, A terminates the query. Having terminated the query, A may direct additional queries to other clients within the group that have not yet been queried. If the similarity value exceeds the second threshold, client A evaluates which lists it wants to retrieve from the responding peers. If the relative size of any of the other lists is sufficient, A may request the complete list from the responding peer. For example, A may request a full recording history from one respondent and a complete list of ratings from another. Upon receiving the lists, A further evaluates the lists for correlation, and uses them to generate collaborative suggestions for the user. Appropriate methods for computing correlation and generating collaborative suggestions are described in the co-pending application previously mentioned, K. Ali, et al, supra.

Method 2: Iterative Disclosure.

The previous method assumed that sending a full list of items can be done in small packets that travel easily over the connecting network. When the lists are large, like the recording history, or the ratings list, this method is inefficient. An alternate approach is the sharing of the lists in successive blocks, in iterative fashion. In the following description, as above, Client A is the originator and Client B is the target:

Client A takes a block that includes the first n consecutive items in it's list and transmits it to B.

B receives the list and determines matching items; and transmits a list of matching items to A.

A creates a temporary matching items list, where it saves the list received from B, and transmits another block of n items to B. B responds with another list of matching items, which A adds to its temporary list. With each succeeding response from B, A evaluates what portion of the total number of items shared with B the two peers have in common. When enough items have been tested by repeating the above steps, the ratio remains relatively constant from one iteration to the next. At that point, the similarity value for the partial data is representative of the similarity value for the entire list. The query then proceeds as described above, in which A requests from the target the lists it wishes to receive.

Method 3: Iterative Disclosure of Ratings

Similar to the previous method:

Again, A Sends partial lists to B, and B echoes back what it has. Meanwhile A and B keep track of what they share. In addition, the lists that A sends to B contain A's ratings of the items, and B's answers contain B's ratings of the items matching items. Thus, both A and B maintain a list of items, with both A's and B's ratings. This allows A and B to use standard correlation math to determine how well A and B. As the size of the list of items they have in common grows, the correlation factors will teid to mirror the real correlation factor that would be obtained if all available data was known to both A and B.

According to a minimum confidence requirement standard (based on the number of items shared from A, and number of items that are shared) the process is repeated until the standard is satisfied. After that, A and B can determine if the correlation is high enough to proceed with sharing full lists or to terminate the connection, in the event of an insufficient correlation.

Those skilled in the art will recognize that the roles of originator and target have been employed for purposes of description. In actual fact, each client within a group is both an originator and a target, wherein each client directs queries to other clients and receives queries from other clients. Furthermore, while the client-server system of the copending application and the present peer-to-peer system have been treated as parallel systems for the sake of description, the skilled practitioner will appreciate that they are, in fact, one system having parallel functionalities. Thus, the client units interact with the server in the usual client-server fashion, and simultaneously also have the peer-to-peer functionality herein described. The invention is implemented using conventional techniques well known to those skilled in the art of software engineering and computer programming. The network implementation will be apparent to those skilled in the design and administration of data networks.

While a narrow band dial up connection renders the transmission between clients of large media files impractical, broadband implementations of the invention, wherein connection is by means of fiber optic or coaxial cable, DSL, T1 or T3, or the like, enable the peer-to-peer sharing of the underlying content, as well as the user preference files.

Although the invention has been described herein with reference to certain preferred embodiments, one skilled in the art will readily appreciate that other applications may be substituted without departing from the spirit and scope of the present invention. Accordingly, the invention should only be limited by the Claims included below.

What is claimed is:

1. A peer-to-peer system for collaborative suggestions or media propagation comprising:

a server that (a) organizes at least two clients into at least a first group, the server being separate from the at least two clients, and (b) sends to the at least two clients grouping data that indicates one or more clients that are also in the first group;

the at least two clients, connected to each other via a network, each client of the at least two clients comprising:

logic that creates one or more lists that are indicative of interests of a corresponding user of the client; and logic that stores the one or more lists on at least one storage device in communication with the client;

logic at a first client of the at least two clients that, based on the grouping data, identifies one or more other clients in the first group and transmits to the one or more other clients at least a portion of the one or more lists of the first client;

logic at a second client of the at least two clients that estimates similarity between the first client and the second client based at least in part on the at least a portion of the one or more lists of the first client and one or more lists of the second client, and that determines therefrom whether the second client is similar to the first client; and logic at at least one of the first client and the second client that, when the first client is determined to be similar to the second client, causes information related to the one or more lists of the first client or the one or more lists of the second client to be shared between the first client and the second client.

2. The system of claim 1, wherein each of the clients among the at least two clients is periodically in contact with the server.

3. The system of claim 1,
wherein the grouping data comprises a network address for each client within the first group.

4. The system of claim 1, wherein the one or more lists include at least one of:
a list of items stored on the client;
a list of items desired by the user of the client; and
a list of items rated by the user of the client.

5. The system of claim 1, wherein the logic that estimates similarity generates a similarity value by at least:
determining a number of items common to the one or more lists of the second client and the at least a portion of the one or more lists of the first client;
dividing the number of common items by a total number of items in the one or more lists of the second client or the at least a portion of the one or more lists of the first client.

6. The system of claim 1, further comprising:
logic at the second client that, when the first client is determined not to be similar to the second client, forwards the at least a portion of the one or more lists of the first client in a query to a third client in the first group, with a reference to the second client added to the query so the query is not redirected to the second client, and so the first client has a record of clients that have already estimated their similarity to the first client.

7. The system of claim 1, further comprising:
logic at the first client that receives, from the second client, a similarity value;
logic that, based on the similarity value, determines whether to request one or more lists from the second client.

8. The system of claim 1, wherein the first client further comprises logic that, when the second client is determined to be similar to the first client, utilizes information shared by the second client to generate suggestions for the user corresponding to the first client.

9. The system of claim 1, wherein the first client further comprises logic that, when the second client is determined to be similar to the first client, requests items of media content from the second client, based on information shared by the second client.

10. The system of claim 1, wherein the first client iteratively queries the second client, and wherein an abbreviated list is transmitted with each query, the abbreviated lists comprising successive blocks of n consecutive entries from a complete list.

11. The system of claim 10, wherein the second client iteratively evaluates each abbreviated list received for items common to both the first client and the second client and transmits a list of the common items to the first client.

12. The system of claim 11, wherein the first client evaluates the lists of common items received from the second client and estimates similarity for the corresponding abbreviated list, and wherein an average of the similarity estimates constitutes an estimate of similarity between the first client and the second client.

13. The system of claim 12, wherein the lists exchanged between the first client and the second client include user ratings for each item, and wherein a correlation is calculated for each list based on the user ratings.

14. The system of claim 13, wherein correlations derived from the abbreviated lists converges, as the number of common items grows, to an actual correlation that would be obtained if all available data from the first client and the second client were known.

15. The system of claim 14, wherein the iterative queries continue until confidence in the calculated correlation equals or exceeds a minimum confidence level, based on total number of items shared from the first client and a total number of common items.

16. The system of claim 15, wherein the first client:
terminates the query based on the calculated correlation; or
requests one or more complete lists from the second client, based on the calculated correlation.

17. The system of claim 1, wherein the system is a component of a network-based personal video recording system.

18. A peer-to-peer method of generating collaborative suggestions or propagating items of media content comprising:
a server organizing at least two clients in a network into at least a first group, the server being separate from the at least two clients;
the server sending to the at least two clients grouping data that indicates one or more clients that are also in the first group;
at each particular client of the at least two clients:
creating one or more lists that are indicative of interests of a corresponding user of the particular client;
storing the one or more lists on at least one storage device in communication with the particular client;
based on the grouping data, a first client in the first group identifying at least a second client in the first group and transmitting to the second client at least a portion of the one or more lists of the first client;
estimating similarity, at the second client, between the first client and the second client, based at least in part on the at least a portion of the one or more lists of the first client and the one or more lists of the second client and determining therefrom whether the second client is similar to the first client; and
when the first client is determined to be similar to the second client, one or both of the first client and the second client causing information related to the one or more lists of the first client or the one or more lists of the second client to be shared between the first client and the second client.

19. The method of claim 18, wherein each of the clients among the at least two clients is periodically in contact with the server.

20. The method of claim 18, further comprising:
wherein the grouping data comprises a network address of each client within the first group.

21. The method of claim 18, wherein the one or more lists stored at the first client include at least one of:
a list of items stored on the first client;
a list of items desired by the user of the first client; and
a list of items rated by the user of the first client.

22. The method of claim 18, wherein estimating similarity comprises computing a similarity value by at least:
determining the number of items common to the at least a portion of the one or more lists of the first client and the one or more lists of the second client;
dividing the number of common items by a total number of items in the one or more lists of the second client or the at least a portion of the one or more lists of the first client.

23. The method of claim 18, further comprising:
when the second client is determined not to be similar to the first client, the second client forwarding at least a portion of the one or more lists of the second client in a query to a third client of the at least two clients with a reference to the second client added to the query so the query is not redirected to the second client, and so the first client has a record of clients that have already estimated their similarity to the first client.

24. The method of claim 18, further comprising:
the second client sending a similarity value to the first client;
based on the similarity value, the first client requesting one or more of the one or more lists from the second client.

25. The method of claim 18, further comprising:
when the first client is determined to be similar to the second client, the first client utilizing information shared by the second client to generate suggestions for the user corresponding to the first client.

26. The method of claim 18, further comprising:
when the first client is determined to be similar to the second client, the first client requesting items of media content from the second client, based on information shared by the second client.

27. The method of claim 18, further comprising:
iteratively querying, by the first client, the second client, wherein an abbreviated list is transmitted with each query, the abbreviated lists comprising consecutive blocks of n consecutive entries from a complete list, starting at a beginning of the complete list.

28. The method of claim 27, further comprising:
iteratively evaluating, by the second client, each abbreviated list for items common to both the first client and second client; and
transmitting, by the second client, a list of the common items to the first client.

29. The method of claim 28, further comprising:
evaluating, by the first client, the lists of common items received from the second client; and
estimating similarity, by the first client, for the corresponding abbreviated list, wherein an average of the similarity estimates constitutes an estimate of similarity between the first client and the second client.

30. The method of claim 29, further comprising:
calculating, by the first client, a correlation for each abbreviated list based on user ratings for each item, wherein the lists exchanged between the first client and the second client include the user ratings.

31. The method of claim 30, wherein correlations derived from the abbreviated lists converge, as the number of common items grows, to an actual correlation that would be obtained if all available data from the first client and the second client were known.

32. The method of claim 30, wherein the iterative queries continue until confidence in the calculated correlation equals or exceeds a minimum confidence level, based on total number of items shared from the first client and a total number of common items.

33. The method of claim 32, further comprising one of:
terminating, by the first client, the query based on the calculated correlation; and
requesting, by the first client, one or more complete lists from the second client, based on the calculated correlation.

34. A peer-to-peer method of generating collaborative suggestions or propagating items of media content comprising:
organizing at least two clients connected across a network into at least one group and sending each client of the at least two clients a corresponding set of network addresses of all other clients in the at least one group;
a first client in the at least one group querying a second client in the at least one group using the corresponding set of network addresses received by the first client and transmitting a first list containing preferences of a first user;
the second client comparing the first list with a second list, containing preferences of a second user corresponding to the second client, and evaluating the comparison to determine a measure of similarity between the first list and the second list; and
when the measure of similarity between the first list and the second list is equal to or above a threshold, transferring, from the second client to the first client, information for performing at least one of: generating suggestions or downloading actual media content.

35. The method of claim 34, wherein the first list describes one or more of:
items stored on the first client;
items desired by the user of the first client; or
items rated by the user of the first client.

36. The method of claim 34, wherein determining the measure of similarity comprises computing a similarity value by at least:
determining the number of items common to the first list and the second list;
dividing the number of common items by a total number of items in the first list or the second list.

37. The method of claim 34, further comprising:
the second client sending a similarity value to the first client; and
based on the similarity value, the first client requesting the second list from the second client.

38. The method of claim 34, further comprising:
when the first client is determined to be similar to the second client, the first client utilizing information shared by the second client to generate suggestions for the user corresponding to the first client.

39. The method of claim 34, further comprising:
when the first client is determined to be similar to the second client, the first client requesting items of media content from the second client, based on information shared by the second client.

40. A peer-to-peer system of generating collaborative suggestions or propagating items of media content comprising:
logic that organizes at least two clients connected across a network into at least one group and sends each client of the at least two clients a corresponding set of network addresses of all other clients in the at least one group;
a first client in the at least one group, that queries a second client in the at least one group using the corresponding set of network addresses received by the first client and transmits a first list containing preferences of a first user;
the second client, that compares the first list with a second list, containing preferences of a second user corresponding to the second client, and evaluates the comparison to determine a measure of similarity between the first list and the second list;
and
logic at at least one of the first client and the second client that causes, when the similarity between the first list and the second list is equal to or above a threshold, the transfer of information from the second client to the first client for performing at least one of: generating suggestions or downloading actual media content.

41. The system of claim 40, wherein the first list describes one or more of:
   items stored on the first client;
   items desired by the user of the first client; or
   items rated by the user of the first client.

42. The system of claim 40, wherein determining the measure of similarity comprises computing a similarity value by at least:
   determining the number of items common to the first list and the second list;
   dividing the number of common items by a total number of items in the first list or the second list.

43. The system of claim 40, wherein:
   the second client sends a similarity value to the first client; and
   based on the similarity value, the first client requests the second list from the second client.

44. The system of claim 40, wherein:
   when the first client is determined to be similar to the second client, the first client utilizes information shared by the second client to generate suggestions for the user corresponding to the first client.

45. The system of claim 40, wherein:
   when the first client is determined to be similar to the second client, the first client requests items of media content from the second client, based on information shared by the second client.

* * * * *